US008761507B1

(12) United States Patent
Steger

(10) Patent No.: US 8,761,507 B1
(45) Date of Patent: Jun. 24, 2014

(54) BILATERAL FILTER OPTIMIZATION

(75) Inventor: Eron Samuel Steger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 13/564,852

(22) Filed: Aug. 2, 2012

(51) Int. Cl.
*G06K 9/00* (2006.01)
*G06K 9/38* (2006.01)

(52) U.S. Cl.
USPC .......................... 382/167; 382/168; 382/172

(58) Field of Classification Search
CPC .............................................. G06T 2207/20028
See application file for complete search history.

(56) References Cited

U.S. PATENT DOCUMENTS

| | | | | |
|---|---|---|---|---|
| 7,889,923 | B1* | 2/2011 | Carr et al. | 382/168 |
| 8,139,888 | B2* | 3/2012 | Porikli | 382/261 |
| 8,260,076 | B1* | 9/2012 | Yang et al. | 382/261 |
| 8,315,473 | B1* | 11/2012 | Tao et al. | 382/260 |
| 2007/0183682 | A1* | 8/2007 | Weiss | 382/261 |
| 2008/0298680 | A1* | 12/2008 | Miller et al. | 382/168 |
| 2009/0087122 | A1* | 4/2009 | Xu et al. | 382/277 |
| 2009/0317014 | A1* | 12/2009 | Porikli | 382/261 |
| 2009/0317015 | A1* | 12/2009 | Porikli | 382/261 |
| 2011/0110601 | A1* | 5/2011 | Hong | 382/255 |
| 2012/0224784 | A1* | 9/2012 | Cohen et al. | 382/260 |
| 2013/0071016 | A1* | 3/2013 | Omer et al. | 382/164 |
| 2013/0127894 | A1* | 5/2013 | Cox | 345/589 |

OTHER PUBLICATIONS

Ming Zhang; Gunturk, B.K., "Multiresolution Bilateral Filtering for Image Denoising," Image Processing, IEEE Transactions on , vol. 17, No. 12, pp. 2324,2333, Dec. 2008.*
Tomasi, C., Manduchi, R.: Bilateral filtering for gray and color images. In: ICCV 1998: Proceedings of the Sixth International Conference on Computer Vision.*
Ming Zhang, Bilateral Filter in Image Processing, Beijing University of Posts and Telecommunications, Aug. 2009, <http://etd.lsu.edu/docs/available/etd-05132009-120913/unrestricted/Zhang_thesis.pdf>.*
Glasbey et al, A review of image warping methods, (1998). Journal of Applied Statistics, 25, 155-171.*
Holger Winnemöller , Sven C. Olsen , Bruce Gooch, Real-time video abstraction, ACM SIGGRAPH 2006 Papers, Jul. 30-Aug. 3, 2006, Boston, Massachusetts [doi>10.1145/1179352.1142018].*
Ben Weiss, Fast median and bilateral filtering, ACM Transactions on Graphics (TOG), v.25 n.3, Jul. 2006.*
Yang, et al., "Real-Time O(1) Bilateral Filtering," 8 pages. Computer Vision and Pattern Recognition, 2009. CVPR 2009. IEEE Conference on.
Winnemöller, et al., "Real-Time Video Abstraction," 6 pages. ACM Transactions on Graphics (TOG)—vol. 25 Issue 3, Jul. 2006, pp. 1221-1226.

* cited by examiner

*Primary Examiner* — Andrae S Allison
(74) *Attorney, Agent, or Firm* — Amin, Turocy & Watson, LLP

(57) ABSTRACT

Systems and methods for optimizing bilateral filtering operation, by segmenting an image based on predetermined ranges of colors, and reiteratively blurring the image based on each color. In one aspect, colors associated with pixels that are located in such compartment are substantially similar. A blurring procedure(s) can subsequently be applied to each compartment, wherein pixels on the image that have more color similarity to a color of the compartment are weighted more, as compared to pixels that have less color similarity to the color of such compartment.

31 Claims, 10 Drawing Sheets

BILATERAL FILTER OPTIMIZATION

TECHNICAL FIELD

This disclosure generally relates to bilateral and edge-preserving filtering operations, and more particularly to mitigating processing complexities by optimizing bilateral filter procedures.

BACKGROUND

Filtering procedures represent typical cornerstone operations in modern image processing and related computer vision systems. In general, the term "filtering" can refer to a function that assigns predefined values for a given pixel, based on neighborhood pixels. For example, Gaussian low-pass filtering computes a weighted average of pixel values in the neighborhood of a pixel, in which the weights decrease with distance from the neighborhood center. The noise values that corrupt these nearby pixels are mutually less correlated than the signal values, so noise is averaged away while signal can be preserved.

Similarly, the bilateral filter has been introduced as a non-iterative procedure for smoothing images while retaining edge details. Such filter can further employ a weighted convolution in which the weight for each pixel depends not only on its distance from the center pixel, but also on its relative intensity.

Moreover, as the size of the filter kernel increases, number of required multiplications increases geometrically. Such complexities can further be compounded when a filter is applied over a substantially large image. Since increased multiplications become computationally expensive, increased calculations can cause significant consumption of processing resources, which create bottlenecks and further add to processing times.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In one or more embodiments, the subject application relates to optimizing bilateral filters by compartmentalizing (e.g., bucketing) an image based on predetermined ranges of colors and reiteratively blurring the image based on a color. Such blurring reiteration can occur for each compartment (e.g., a predefined number of color associations) at substantially low resolutions, to maintain processing efficiency and hence mitigate associated bottlenecks.

According to a particular methodology, an image can be initially segmented into a plurality of compartments based on a color that is associated with such pixels. In one aspect, pixels that are located in a compartment are substantially similar (e.g., all pixels in each compartment have colors within a predetermined threshold of a combined or primary color.) Next, a blurring procedure(s) can be applied to such compartmentalized image, wherein pixels on the image that have more color similarity to a color of the compartment (e.g., similarity based on a predetermined threshold) can be weighted more (e.g., at a higher intensity/rate); as compared to pixels that have less color similarity to the color of such compartment. Subsequently, the methodology can be repeated for other colors and/or compartments in the image.

In accordance with a further methodology, initially an image can be compartmentalized based on a range (e.g., 256) of color values, wherein each compartment shares the same color value that is selected from such color value range. Next, a blur procedure (e.g., a Gaussian smoothing) can be performed on the compartmentalized image, to create a blurred image, wherein weighing factors of the blur procedure correlate to a color value selected from the color value range. Such process can subsequently be reiterated for most if not all the color values.

According to a further aspect, a system is disclosed that includes a memory having stored thereon computer executable components, and a processor that is operatively coupled to various non-transitory computer readable medium and/or software components, which further interact with the memory and/or the processor. The system can further include a bucketing component that compartmentalizes an image based on a predetermined range of colors, to contain a plurality of pixels that share a same color value (e.g., as determined by defined threshold value.) The bucketing component can further interact with a blurring component, which employs a bilateral filter to reduce noise and/or detail. Such blurring component can replace an intensity value for each pixel on the image, by a weighted average that correlate with a color value that is associated with a selected compartment. Accordingly, the system can facilitate preserving edges by reiteratively looping through each compartment and its associated color.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Figure 1:
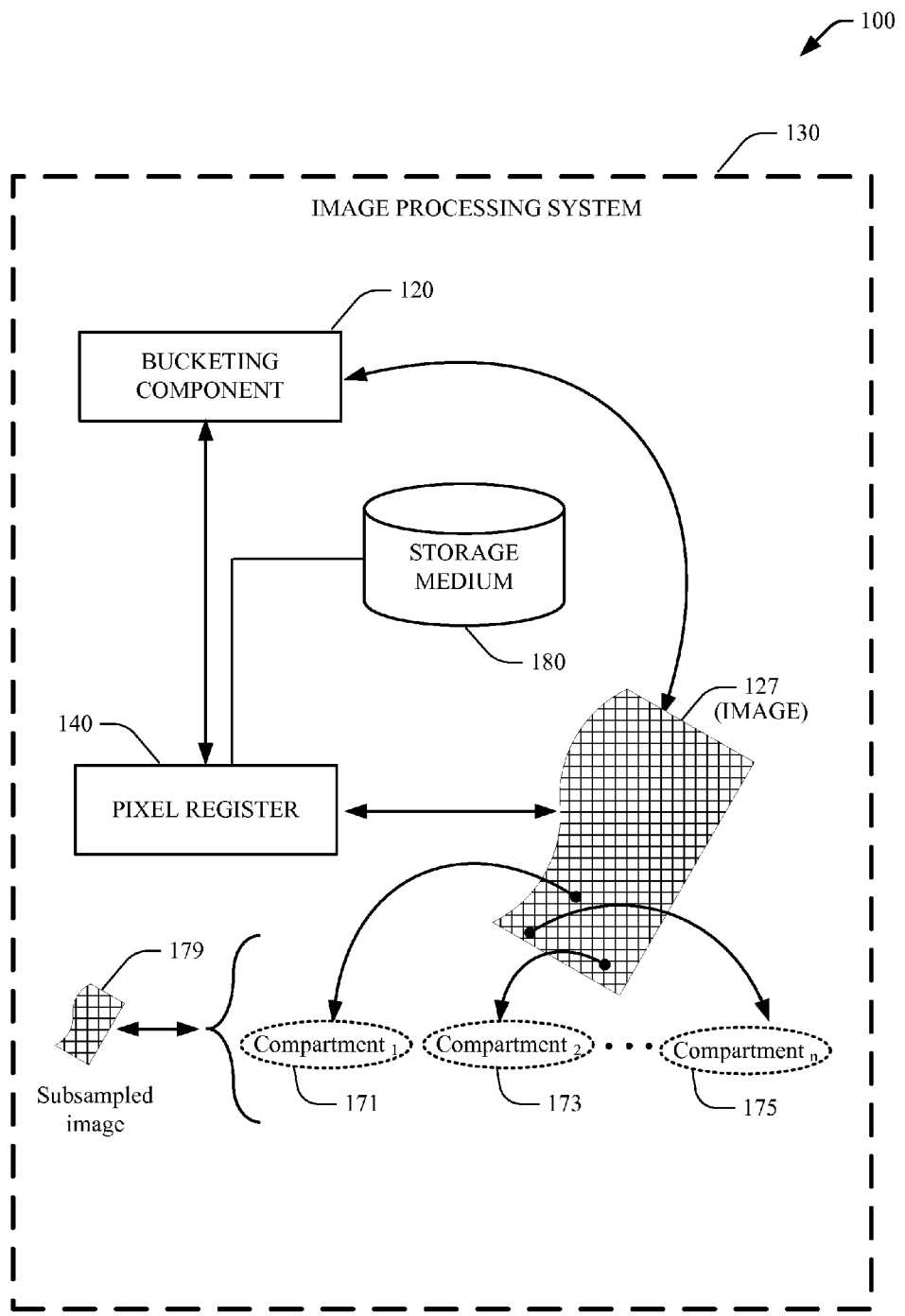
FIG. 1 illustrates a block diagram of an exemplary non-limiting system that facilitates bilateral filtering in accordance with an implementation.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In other instances, structures and devices are shown in block diagram form in order to facilitate describing one or more embodiments.

Systems and methods described herein relate to optimizing bilateral filters by compartmentalizing (e.g., bucketing) an image based on predetermined ranges of colors, and reiteratively blurring the image based on each color. Such blurring reiteration can occur for each compartment (e.g., a predefined number of pixels and/or color associations) in substantially low resolutions, to maintain processing efficiency, and hence mitigate associated bottlenecks. FIG. 1 illustrates a block diagram 100 of an exemplary non-limiting system that facilitates bilateral filter optimization, by employing a bucketing component 120. Such bucketing component 120 can operate on an image 127, as part of an image processing system 130.

The image processing system 130 can perform bilateral filter processing on the image 127 by compartmentalizing or bucketing of such image based on predetermined ranges of colors, and reiteratively blurring the image based on each color, as described in detail below. The image 127 can include any suitable type of photo or digital or artificially rendered data, such as for example that taken by imagery devices (e.g., dynamic and moving representations, static representations, medical technology, scanners, digital cameras, video game displays, virtual landscapes, and the like.) It is to be appreciated that image processing system 130 of the subject disclosure can be applied not only to the imaging apparatus, but also to all apparatuses and systems having an image processing function such as a display, a display device of a printer or the like, and an apparatus including a video processing application. It is further appreciated that the subject disclosure can be applied to an image capturing device itself (e.g., a camera module), as well as an information processing apparatus (e.g., a portable terminal apparatus) that has the camera module or any photographing function connected thereto.

The bucketing component 120 can assign a compartment 171, 173, 175 (1 to "n", where "n" is an integer) or bucket to a range of pixels 1 to "k" (where k is an integer), based on color associations, pixel similarities/intensities and/or a predefined attribute of the pixels (e.g., gray scale, pixel color, position, and the like.) Furthermore, the bucketing component 120 can access data maintained in a pixel register 140 to retrieve computation stage instructions from storage medium 180. Such can occur based on register values, path registers, fetch operations, code/decode stages, execution stages and the like. For example, the pixel register 140 can assign a matrix of pixels emphasizing a predetermined feature of the image 127 (e.g., a range of colors) to a compartment for further smoothing by the optimized bilateral filter.

Typically, the optimized bilateral filtering performed by the image processing system 130 can occur in substantially low resolutions that mitigate bottlenecks, wherein edges of the image 127 can be preserved. According to one particular aspect, the bucketing component 120 can initially segment the image 127 into a plurality of compartments 171, 173, 175 based on a color that is associated with such pixels. For example, colors associated with pixels that are located in such compartment are substantially similar (e.g., all pixels in each compartment have colors within a predetermined threshold of a combined or primary color.) By systematically blurring reiterations for each compartment 171, 173, 175, the bilateral filtering process of the subject innovation can improve performance while preserving edges in the image 127.

For example, and as compared to typical standard bilateral filters, the subject disclosure can reduce bottle necks and improve overall operation efficiencies. In this regard, a typical standard bilateral filter generally combines a normalized weighted sum of its neighboring pixels, to determine a final intensity for a pixel. Typically, such weighting can be determined both by the distance that the pixel is from the source pixel itself, as well as the difference in intensity from such source pixel. Hence, pixels that are closer in their location or intensity to the source pixel can be weighted higher— whereas pixels that remain farther away in location or their intensity are weighted lower. In managing such operations, various aspects of the subject disclosure introduce approximations that increase processing speeds—while maintaining acceptable image attributes and without inducing substantial losses in image quality. The following describes an exemplary code for processing a typical standard/basic bilateral filter, and subsequently introduces efficiencies obtained by employing various aspects of the subject disclosure:

The basic bilateral filter for a pixel is:

[1]
$$I'(x) = \frac{\text{sum\_}[y \text{ in } N(x)](\text{spatial}(|y - x|) * \text{range}(|I(x) - I(y)|)) * I(y)}{\text{sum\_}[y \text{ in } N(x)](\text{spatial}(|y - x|) * \text{range}(|I(x) - I(y)|))}$$

x is the pixel location
I(.) is the source image
I'(.) is the bilateral filtered image
N(x) is the neighborhood of pixels around x
spatial(.) is function that weights pixels by distance
range(.) is a function that weights pixels by intensity one can define spatial(.) and range(.) using the Gaussian function:

[2]
$$\text{spatial}(x) = \exp(-x^2 / 2*o\_s^2)$$
$$\text{range}(x) = \exp(-x^2 / 2*o\_r^2)$$

where
  o_d describes the standard deviation of the spatial function
  o_r describes the standard deviation of the range function Various aspects can calculate an approximation of this function. First, it calculates function [1] assuming constant intensities k for I(x):

[3]
$$J\_k(x) = \frac{\text{sum\_}[y \text{ in } N(x)](\text{spatial}(|y - x|) * \text{range}(k - I(y)|)) * I(y)}{\text{sum\_}[y \text{ in } N(x)](\text{spatial}(|y - x|) * \text{range}(k - I(y)|))}$$

This function can be calculated over the entire image very quickly, as it is a separable filter. That is, it can be evaluated over each dimension separately, unlike function [1]. This function is calculated for a number of different intensities k. Each image J_k can be referred to as a Principal Bilateral Filtered Image Component (PBFIC).
Each pixel of the bilateral filtered image can be determined by linearly combining the closest two intensities calculated for J_k:

[4]
$$I'(x) = (1 - alpha) * J\_k(x) + alpha * J\_{k+1}(x)$$

where
  J_k is the closest PBFIC for the intensity less than I(x)
  J k+1 is the closest PBFIC for the intensity greater than I(x)
  alpha is a number between 0 and 1 describing the distance I(x) from the intensities k and k+1.

It is to be appreciated that the calculation of I'(x) can further be optimized by calculating J_k via a subsampled version of the image, and thus limit operating at full resolution when calculating I'(x). Even though a minor quality effect on the final image quality can occur—yet such optimization can substantially increase speed of operations. Moreover, one can speed up multiple runs of such processes by also subsampling intermediate calculations of I'(x), and hence reserving calculations of the full resolution for the final run.

As described above, one particular aspect of the subject innovation can supply multiple runs and reiterations of processes associated with the above code at substantially lower resolutions. In this regard, associated acts can include, an initial downsampling of the original image. For example, the image 127 (e.g., original message I), wherein the subsampled image 179 can be calculated as:

$$M(p)=I(f(p)),$$

where f(p) maps a pixel location p in the subsampled image to a pixel location in the original image.

Such can provide for further efficiency, as compared to other downsampling methods that combine the values of many neighboring pixels together when shrinking the image. For example, an issue can arise that near edges, the combined intensity often does not fit into the intensity bucket of any of the original pixels—which can be required when equation [4] in above code is being calculated).

Subsequently, PBFICs (equation [3] in above code) can be calculated for the subsampled or low resolution image. Next, the bilateral blurred image (equation [4] of the above code) can be computed. To this end, if such computation represents an intermediate iteration of the bilateral blur, then equation [4] in the above code can be applied for each pixel of the low resolution image, wherein a low resolution result M' can be obtained as represented by:

$$M'(p)=(1-alpha)*J\_k(p)+alpha*J\_k+1(p)$$

Alternatively and if such computation represents a final iteration of the bilateral blur, equation [4] in the above code can be applied on each pixel at the original higher resolution, via employing bilinear filtering on the lower resolution PBFICs—to determine the result I' as:

$$I'(q)=(1-alpha)*bilinear(J\_k,g(q))+alpha*bilinear(J\_k+1,g(q))$$

where g(q) maps a pixel location in the original image to the pixel in the subsampled image (e.g., g(q)=f−1(q)), and bilinear(I, p) employs bilinear sampling to manage with pixel locations that are at decimal locations.

Figure 2:
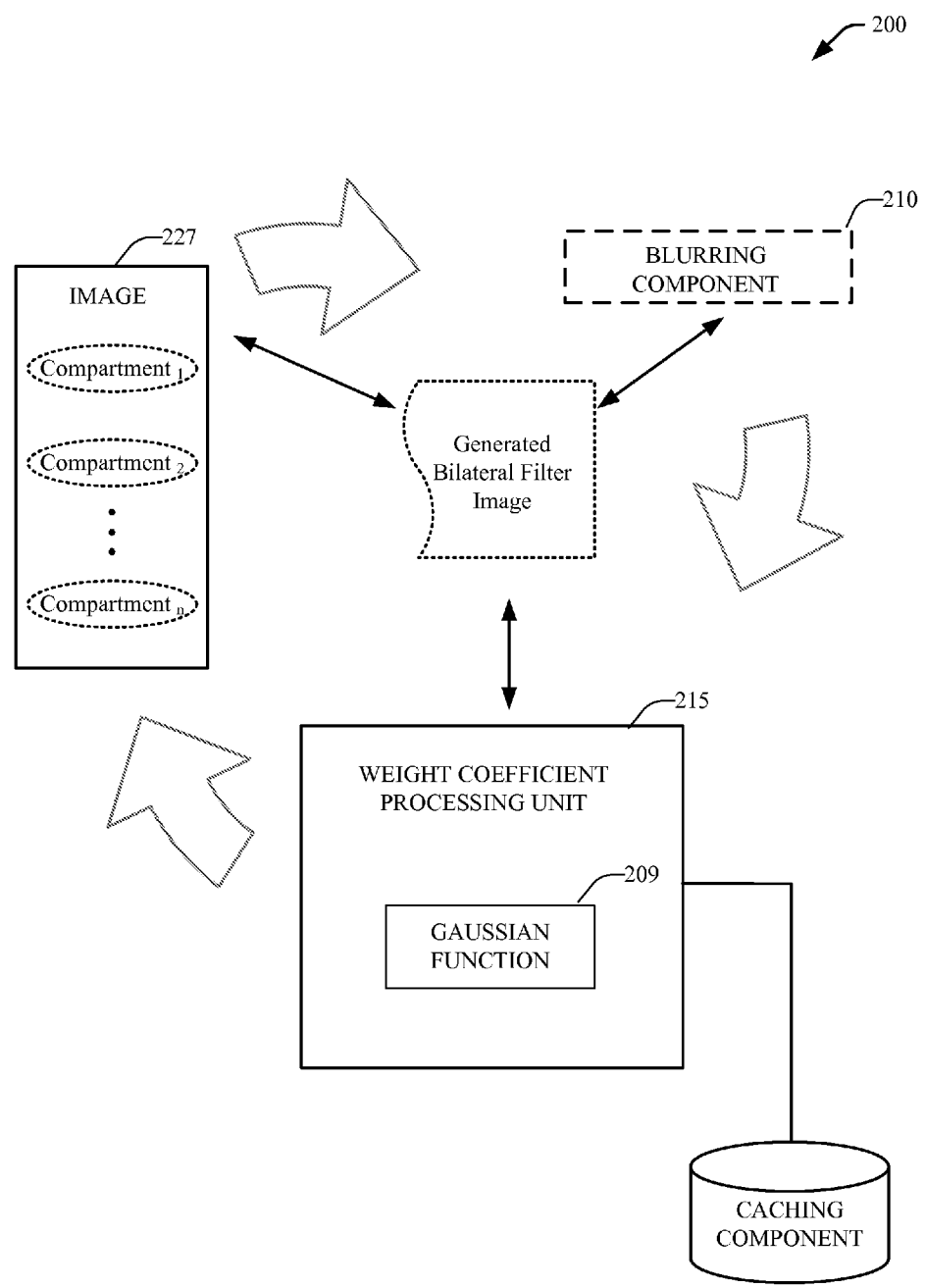
FIG. 2 is an illustration of a block diagram for an exemplary bilateral filtering system with a blurring component in accordance with an implementation.

FIG. 2 illustrates a blurring component 210 that can interact with a weight-coefficient processing unit 215 according to a further aspect. The weight-coefficient processing unit 215 calculates weight coefficient based on similarity of colors criteria, wherein pixels on the image 227 that have more color similarity to a color associated with the compartment can be assigned a different weight as compared to weight assigned to pixels that have less color similarity to the color of the compartment.

Based on such weight assignment to various pixels, the blurring component 210 can raise weighting of pixels at a higher intensity/rate for pixels on the image that have more color similarity to a color of the compartment (e.g., similarity based on a predetermined threshold) as compared to pixels that have less color similarity to the color of the compartment. Subsequently, the blurring component 210 can repeat blurring procedures for other colors and/or compartments in the image.

In one particular aspect, the weight coefficient processing unit 215 can employ a Gaussian function 209 to reduce image noise and reduce detail. In general, such weight coefficient processing unit 215 can employ a type of image-blurring filter that uses a Gaussian function (which also expresses the normal distribution in statistics) for calculating the transformation to apply to each pixel in the image. For example, Gaussian blur effect can typically be generated by convolving the image 227 with a kernel of Gaussian values such as for example implementing Gaussian blurs linearly separable property that divides the process into two passes. In the first pass, a one-dimensional kernel can be employed to blur the image 227 in only the horizontal or vertical direction. In a second pass, another one-dimensional kernel can be employed to blur in the other direction. The resulting effect can represent the same as convolving with a two-dimensional kernel in a single pass, but requires fewer calculations.

Hence, by systematically blurring reiterations for each compartment on the image 227, the blurring component 210 can facilitate bilateral filtering process to induce processing efficiency while preserving edges in the image 227.

Figure 3:
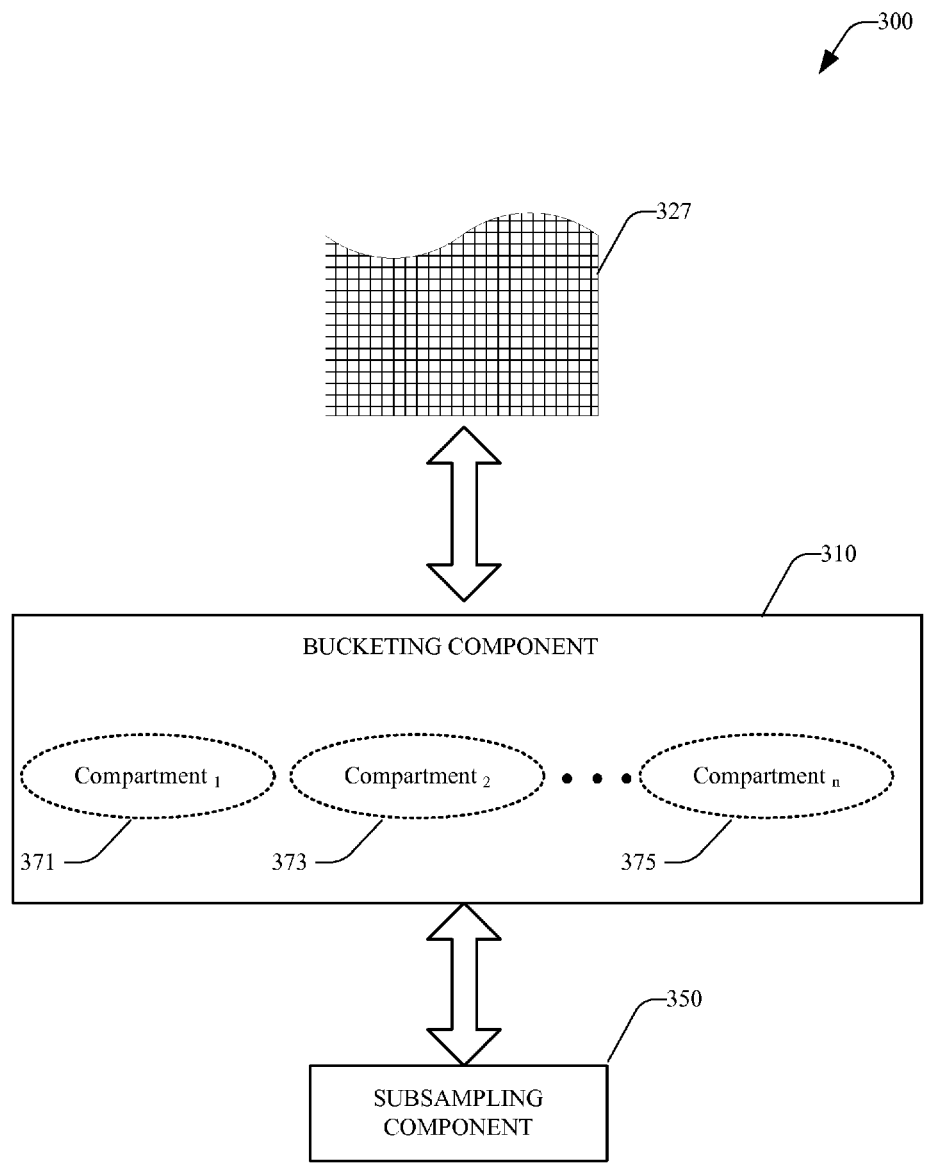
FIG. 3 illustrates a block diagram of compartments created based on color thresholds by the bucketing component in accordance with an implementation.

FIG. 3 illustrates a block diagram 300 of compartments created based on color thresholds and by the bucketing component of the subject innovation. As illustrated, the bucketing component 310 can compartmentalize the image 327 based on predetermined ranges of colors/gray scale spectrum. In one particular aspect, the image 327 can be compartmentalized based on a range of color values. It is to be appreciated that several compartments can also concurrently exist having the same color value, and be distributed throughout different areas of the image.

Each compartment 371, 373, 375 can share a color value being selected from the color value range. For example, various color histograms representing the distribution of colors in the image can further be employed, wherein a color histogram can represent number of pixels that have colors in each of a fixed list of color ranges, which spans the image's color space. Moreover, the color histograms can also be represented and displayed as a smooth function defined over the color space that approximates the pixel counts.

In a related aspect, a subsampling component 350 can interact with the bucketing component 310 to create low resolution subsampled images as described above.

It is to be appreciated that various compression or thinning methods can further be employed in conjunction with aspects of the subject disclosure. By compartmentalizing (e.g., bucketing) an image based on predetermined ranges of colors, and reiteratively blurring the image based on each color of the compartments 371, 373, 375 at substantially low resolutions, the subject disclosure can optimize operation of bilateral filters, to maintain processing efficiency, and hence mitigate associated bottlenecks.

Figure 4:
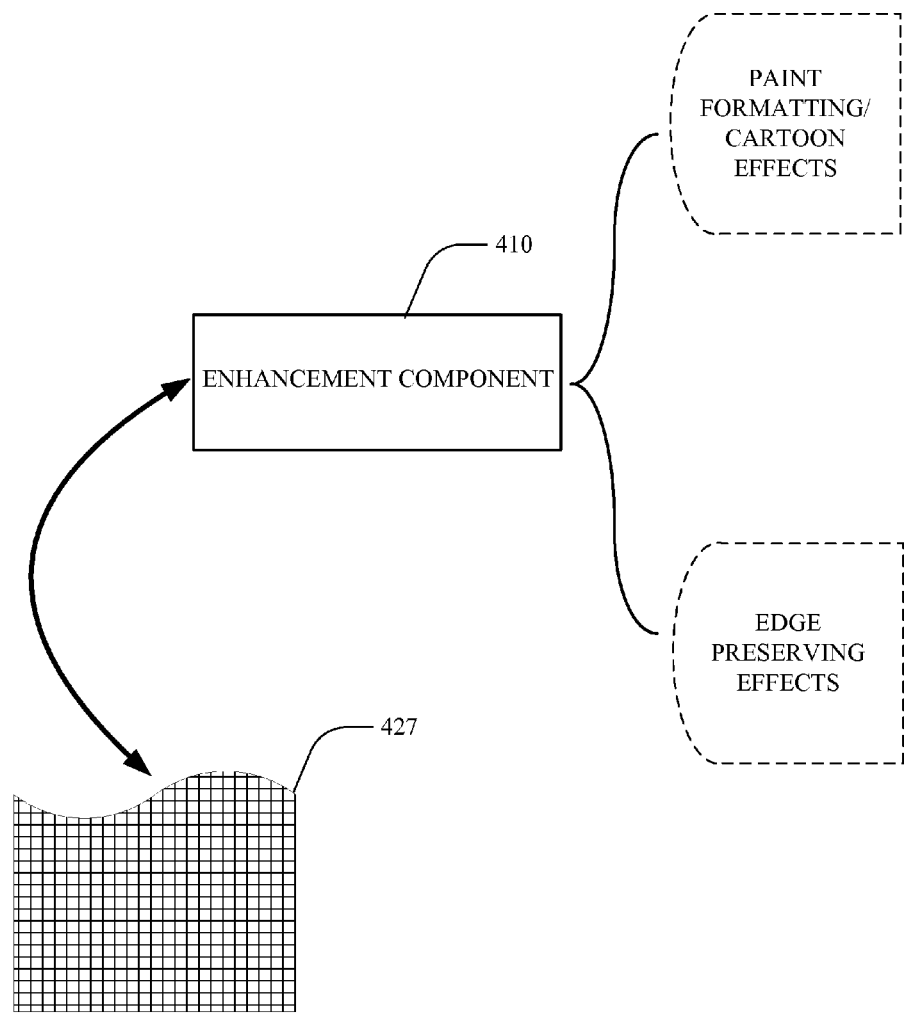
FIG. 4 illustrates an enhancement component that can augment image sectors in accordance with an implementation.

FIG. 4 illustrates an enhancement component 410 with paint formatting capabilities that can also create cartoon shaped effects from an image. The enhancement component 410 can employ the bilateral filter optimization such that abstracting the image 427 cartoon shaped effects can be introduced to emphasize predetermined perceptual information. In one particular aspect, the enhancement component 410 can modify contrast at various regions of the image 427 by employing luminance and color opponency.

Moreover, the enhancement component 410 can employ various antisotropic diffusion filters that can blur discontinuities and further sharpen edges, by employing a conduction function, which can vary on the image. Moreover, the enhancement component 410 can apply various image-based warping techniques for image sharpening and edge-preserving expansion, wherein pixels can be moved pixels along a warping field towards nearby edges.

Figure 5:
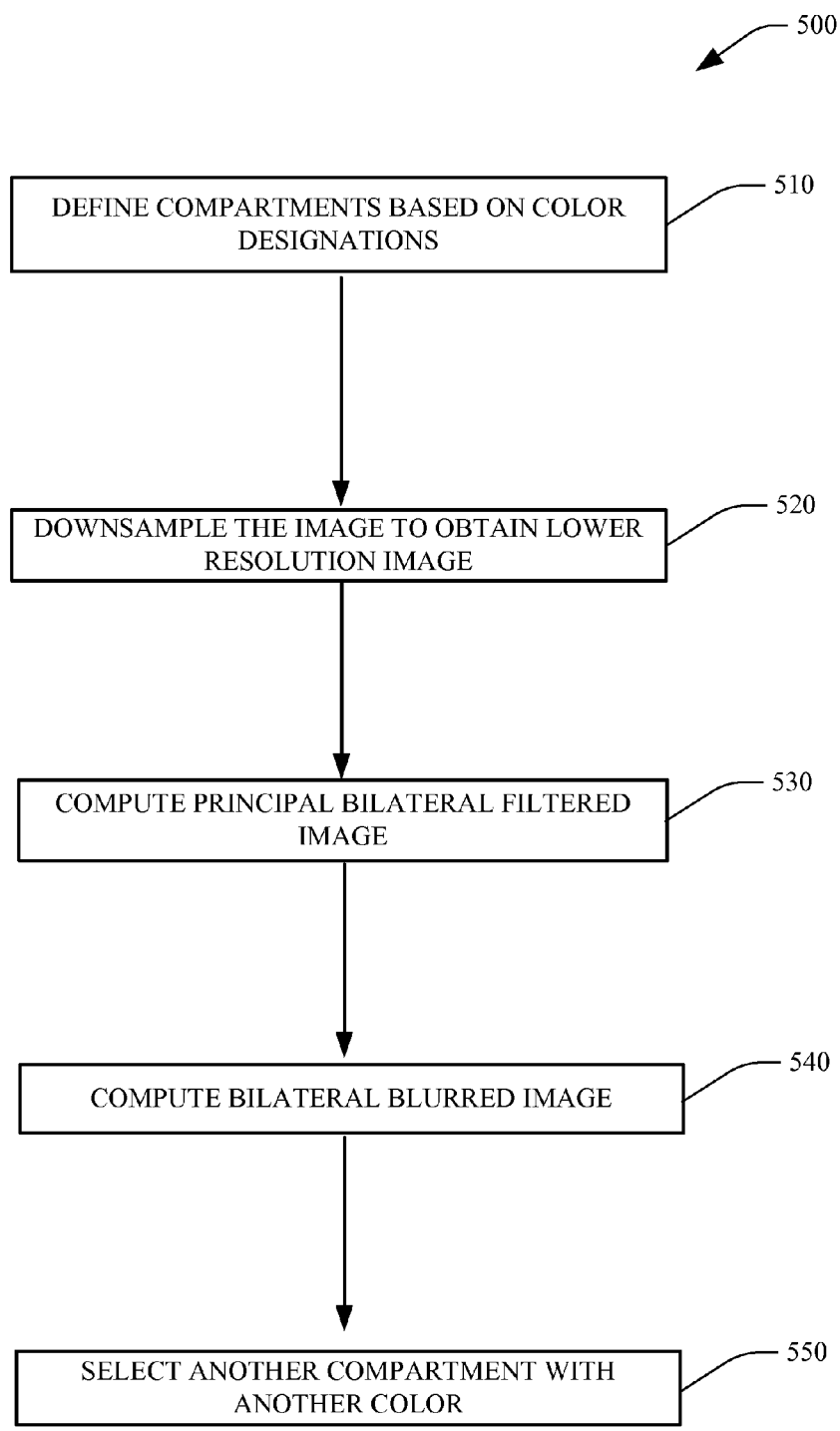
FIG. 5 illustrates a methodology for compartmentalizing an image in accordance with an implementation.

FIG. 5 illustrates a methodology 500 according to a further aspect. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the subject disclosure. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Based on the methodology 500, an image can be segmented into a plurality of compartments based on a color that is associated with its pixels. To this end, initially and at 510 a predetermined set of colors can be designated, wherein each color can define a compartment. For example, colors associated with pixels that are located in a compartment are substantially similar (e.g., all pixels in each compartment have colors within a predetermined threshold of a combined or primary color.) Next, and at 520 a downsampling for the image can occur to obtain a low resolution image. At 530, a Principal Bilateral Filtered Image Component (PBFIC) process can be performed as described in detail with reference to FIG. 1, wherein the downsampled image improves operation efficiency; and the bilateral blurred image can subsequently be computed, at 540.

Subsequently and at 550, the methodology 500 can proceed to selection of another compartment that is associated with another color. By reiterating the methodology 500 for another color, such process can be repeated throughout various compartments that are defined over the image.

Figure 6:
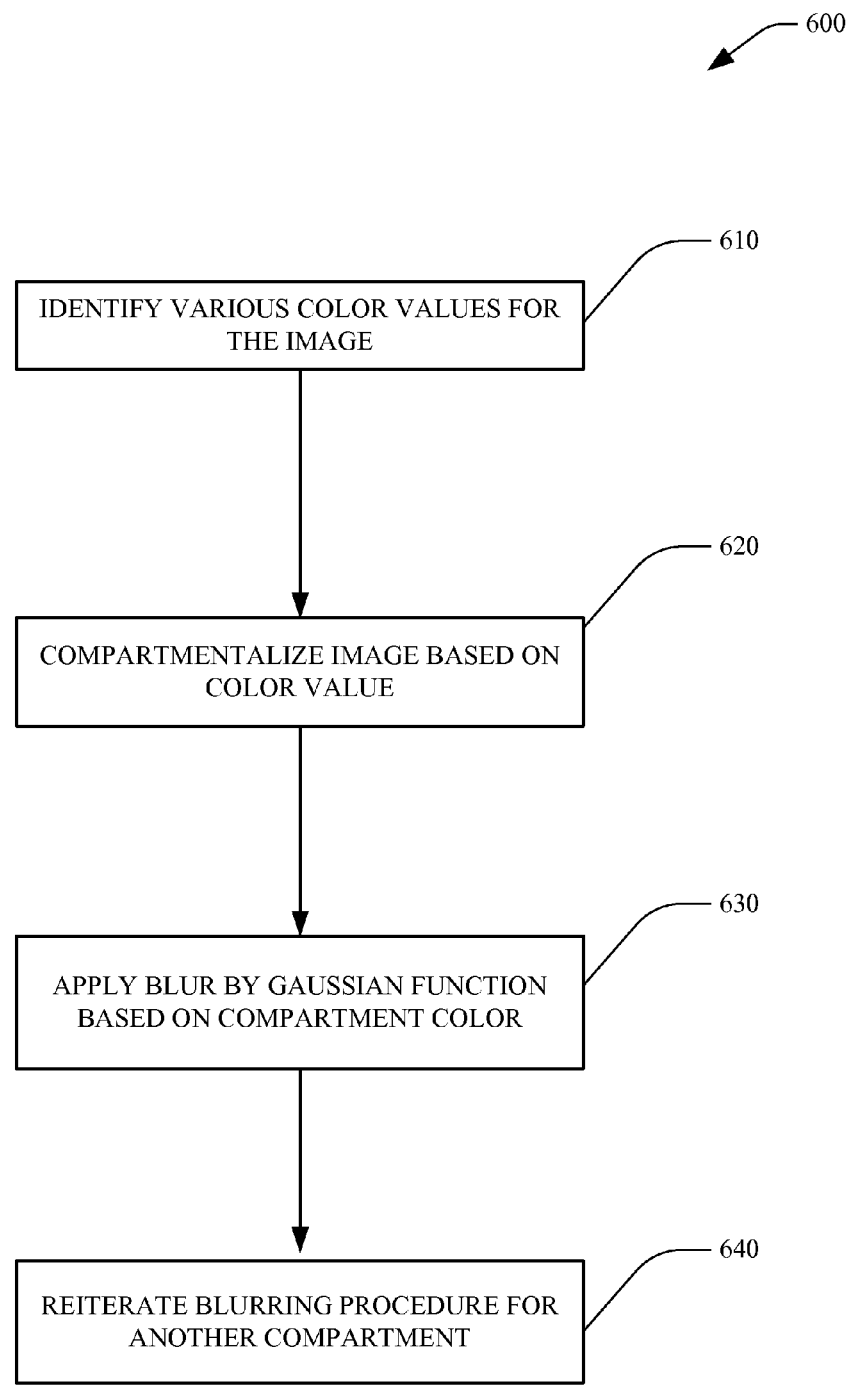
FIG. 6 illustrates a further methodology of bilateral filter optimization in accordance with an implementation.

In accordance with a further aspect, FIG. 6 illustrates a particular methodology 600 for optimizing bilateral filter operation. Initially and at 610, an image can be scanned for identification of any of the "n" color values (e.g., "n" being an integer.) Next and at 620 parts of the image having the same color value can be compartmentalized to same compartments on the image.

A Gaussian smoothing and/or blurring can subsequently be selected, wherein weighing factors for such Gaussian smoothing of the blur procedure correlates to a color value that is assigned to the compartment from the "n" color value range. Subsequently and at 630, the selected Gaussian function can be applied at different passes in horizontal and/or vertical directions from the compartment.

For example, in a first pass the Gaussian blurring can be employed to blur an image in only a horizontal direction traversing from the compartment, and in a second pass, such function is employed to blur in the vertical direction. As explained above, the weight coefficient for the Gaussian function can be based on similarity criteria as applied to color of a compartment, wherein pixels on the image that have more color similarity to a color associated with the compartment can be assigned a different weight, as compared to weight assigned to pixels that have less color similarity to the color of the compartment. The blurring reiteration can occur for each compartment (e.g., a predefined number of pixels and/or color associations) at substantially low resolutions, to maintain processing efficiency and mitigating associated bottlenecks.

Figure 7:
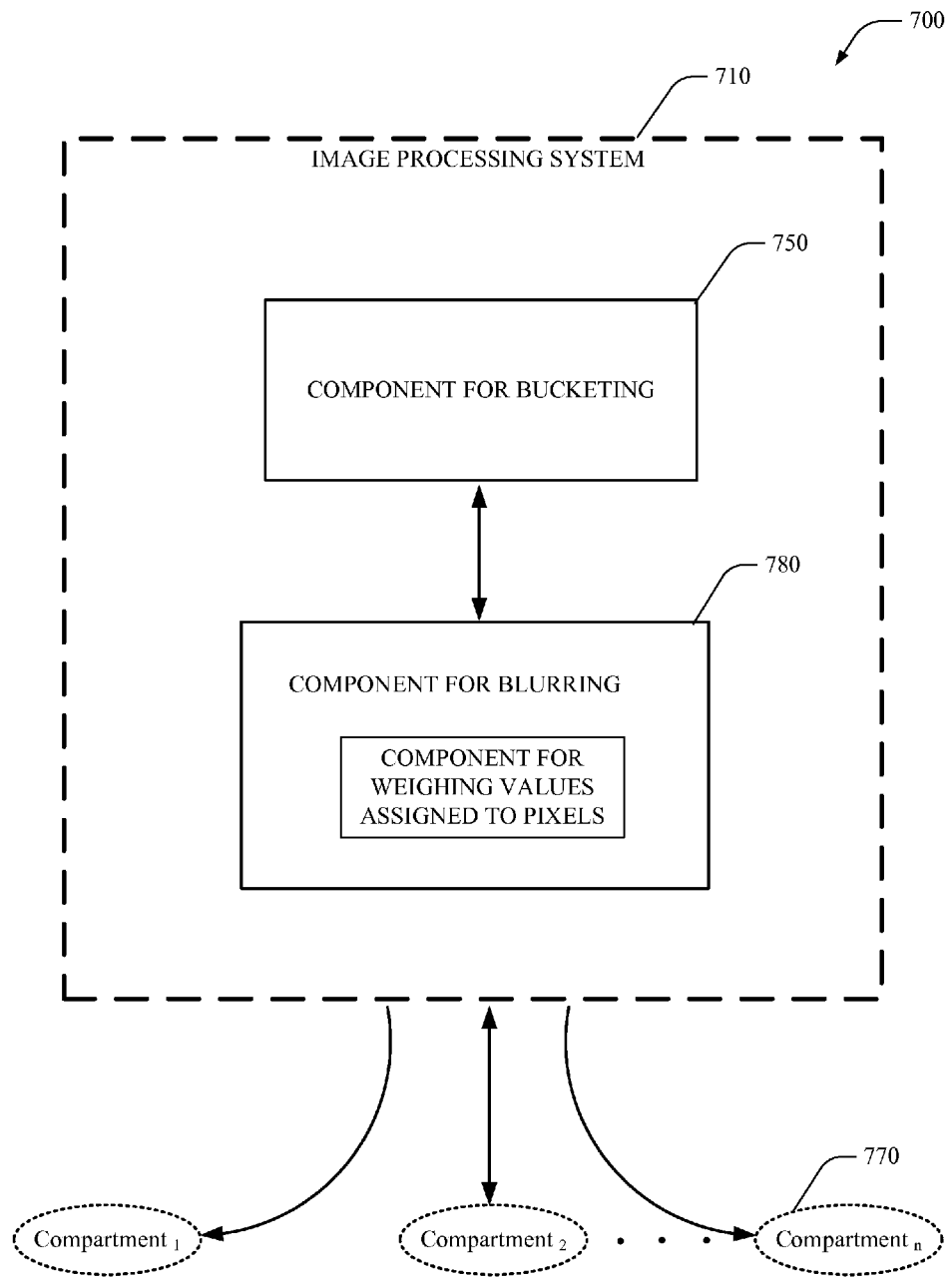
FIG. 7 illustrates a further block diagram of an exemplary system in accordance with an implementation.

FIG. 7 illustrates an exemplary block diagram 700 of components for optimizing bilateral filter operations according to a further aspect aspect of the subject innovation. The image processing system 710 can typically perform operation in substantially low resolutions that mitigate bottlenecks, wherein edges of the image can be preserved. Such image processing system 710 can include a component for bucketing 750 (e.g., means for bucketing), which can assign a plurality of pixels sharing a predetermined feature of the image, such as color to a compartment 770. For example, by assigning the pixels to a compartment, the component for bucketing 750 can group together pixels that pass a predetermined threshold related to a combined or primary color threshold. Moreover, a component for blurring 780 (e.g., means for blurring) can process weight coefficient based on similarity criteria, wherein pixels on the image that have more color similarity to a color associated with a compartment can be assigned a different weight, as compared to weight assigned to pixels that have less color similarity to the color of the compartment.

By analyzing weights assigned to various pixels on the image, the component for blurring can raise amount of blur (or in the alternative focus) at a higher intensity/rate for pixels on the image that have higher color similarity to a color of the compartment, than other pixels having a lower color similarity to the color of the compartment. By systematically reiterating the process, an intensity value related to color for each pixel on the image, can thus be replaced with a weighted average that correlate with a color value being associated with a compartment.

Such operation can further facilitate bilateral filtering process, since each compartment and its associated colors can be reiteratively looped through, to reduce data processing requirements while preserving edges in the image.

Figure 8:
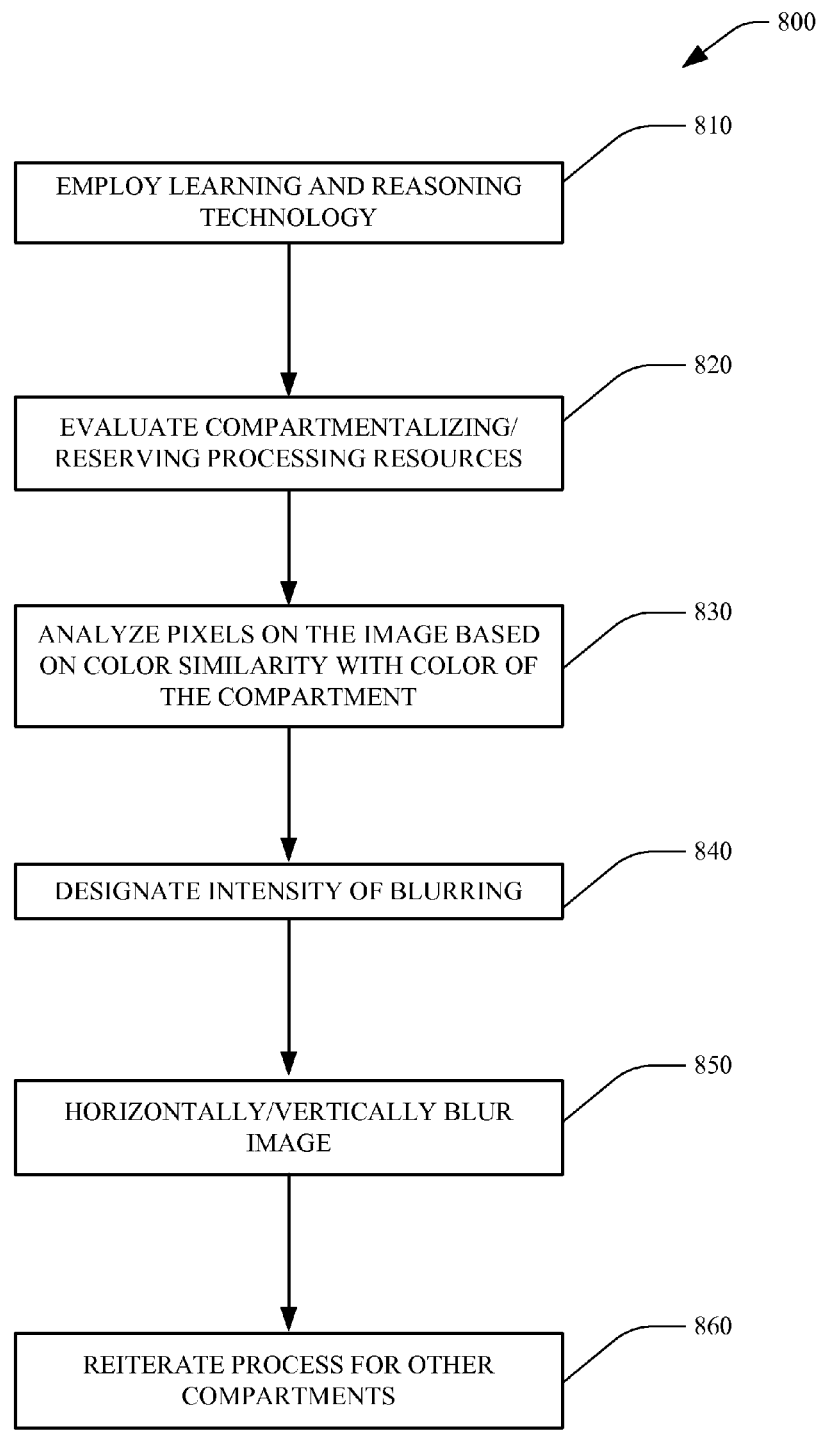
FIG. 8 illustrates a further methodology that can optimize bilateral filtering operations in accordance with an implementation.

FIG. 8 illustrates a further methodology 800 according to a particular aspect of the subject innovation, for optimizing bilateral filter operations. The methodology 800 can optimize bilateral filter processing by compartmentalizing an image based on predetermined ranges of colors, and reiteratively blurring the image based on each color. Initially and at 810, learning and reasoning can be employed to evaluate compartmentalizing or reserving processing resources required for segmenting the image at 820; and its automation as described earlier.

At 830, pixels positioned on the image can be analyzed based on their color similarity to the color associated with the compartment itself. Next and at 840, intensity of blurring can be designated based on correlations to weighing coefficients and threshold criteria employed for evaluating color similarity.

Subsequently and at 850, data can be processed to learn of existing operations and to horizontally and/or vertically blur image segments, which can further be associated with selection and/or modification of weighing coefficients parameters. At 860, the process can be reiteratively performed on other compartments, which can be systematically selected from the image, such as based on color attributes, image use, processing resources, and the like.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 9:
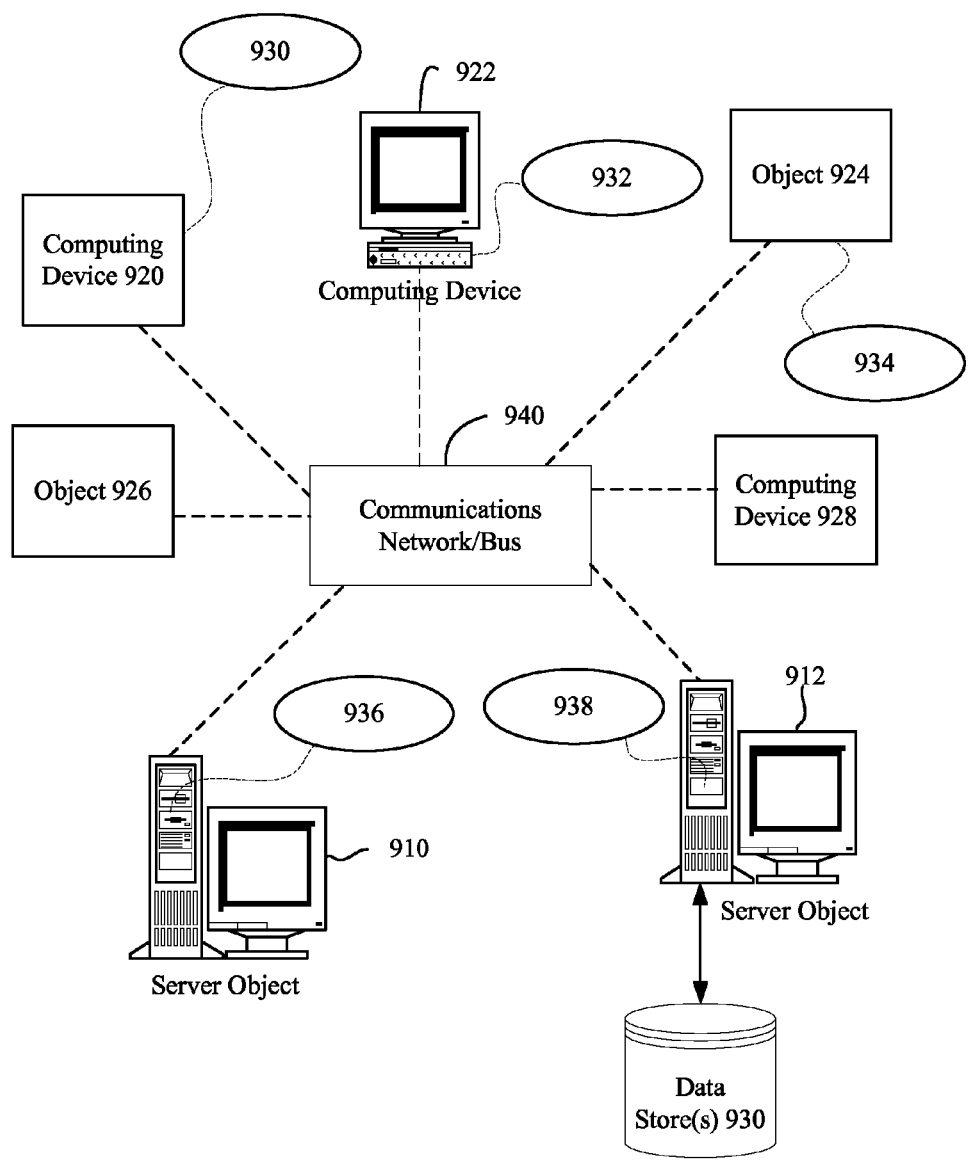
FIG. 9 provides a schematic diagram of an exemplary networked or distributed computing environment in which embodiments described herein can be implemented.

FIG. 9 provides a schematic diagram of an exemplary networked or distributed computing environment in which embodiments described herein can be implemented. The distributed computing environment includes computing objects 910, 912, etc. and computing objects or devices 920, 922, 924, 926, 928, etc., which can include programs, methods, data stores, programmable logic, etc., as represented by applications 930, 932, 934, 936, 938. It is to be appreciated that computing objects 910, 912, etc. and computing objects or devices 920, 922, 924, 926, 928, etc. can include different devices, such as personal digital assistants (PDAs), audio/video devices, mobile phones, MPEG-1 Audio Layer 3 (MP3) players, personal computers, laptops, tablets, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 can include other computing objects and computing devices that provide services to the system of FIG. 9, and/or can represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices can process data, or request transaction services or tasks that can implicate the techniques for systems as described herein for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 940 can be the Internet, for example, the computing objects 910, 912, etc. can be Web servers, file servers, media servers, etc. with which the client computing objects or devices 920, 922, 924, 926, 928, etc. communicate via any of a number of known protocols, such as the hypertext transfer protocol (HTTP). Computing objects 910, 912, etc. can also serve as client computing objects or devices 920, 922, 924, 926, 928, etc., as can be characteristic of a distributed computing environment.

Exemplary Computing Device

Figure 10:
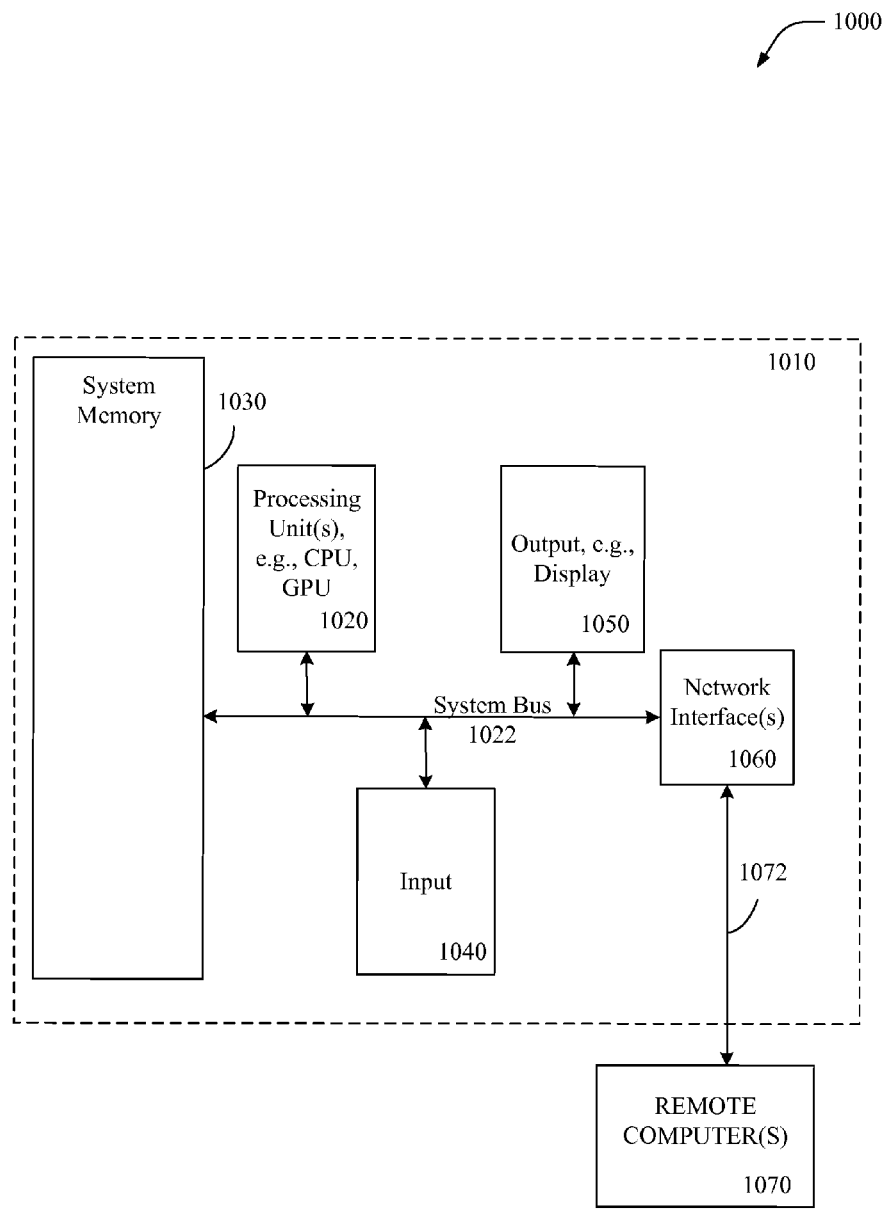
FIG. 10 illustrates an example of a suitable computing environment in which one or aspects of the embodiments described herein can be implemented.

As mentioned, advantageously, the techniques described herein can be applied to any suitable device. It is to be understood, therefore, that handheld, portable and other computing devices and computing objects of all kinds are contemplated for use in connection with the various embodiments, e.g., anywhere that a device may wish to read or write transactions from or to a data store. Accordingly, the below remote computer described below in FIG. 10 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described herein. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing environment 1000 in which one or aspects of the embodiments described herein can be implemented, although as made clear above, the computing environment 1000 is only one example of a suitable computing environment and is not intended to suggest any limitation as to scope of use or functionality. Neither is the computing environment 1000 to be interpreted as having any dependency or requirement relating to any one or combination of components illustrated in the exemplary computing environment 1000.

With reference to FIG. 10, an exemplary computing environment 1000 for implementing one or more embodiments includes a computing device in the form of a computer 1010 is provided. Components of computer 1010 can include, but are not limited to, a processing unit 1020, a memory 1030, and a system bus 1022 that couples various system components including the system memory to the processing unit 1020. Computer 1010 can be employed for example in connection with implementing the systems or components disclosed above in connection with FIGS. 1-4, and 7.

Computer 1010 typically includes a variety of computer readable media and can be any available media that can be accessed by computer 1010. The memory 1030 can include computer storage media in the form of volatile and/or non-volatile memory such as read only memory (ROM) and/or random access memory (RAM). By way of example, and not limitation, memory 1030 can also include an operating system, application programs, other program modules, and program data.

A user can enter commands and information into the computer 1010 through input devices 1040, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 1010. A monitor or other type of display device can be also connected to the system bus 1022 via an interface, such as output interface 1050. In addition to a monitor, computers can also include other peripheral output devices such as speakers and a printer, which can be connected through output interface 1050.

The computer 1010 can operate in a networked or distributed environment using logical connections to one or more other remote computers, such as remote computer 1070. The remote computer 1070 can be a personal computer, a server, a router, a network PC, a peer device or other common network node, or any other remote media consumption or transmission device, and can include any or all of the elements described above relative to the computer 1010. The logical connections depicted in FIG. 10 include a network 1072, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described herein. Also, various embodiments described herein can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal (e.g., a carrier wave or other transport mechanism) and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessor and/or other electronic units designed to perform the functions described herein, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules or components (e.g., procedures, functions, and so on) that perform the functions described herein. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. The invention is not to be limited to any single embodiment, but rather can be construed in breadth, spirit and scope in accordance with the appended claims.

What is claimed is:

1. A method, comprising:
   segmenting, by a system including a processor, an image into a plurality of compartments, wherein each compartment has an associated color and respective pixels within each compartment have respective colors within a predetermined threshold of the associated color; and
   iteratively for each compartment, employing, by the system, a bilateral filter process for blurring the image in one or more directions traversing from the compartment based on the color associated with the compartment to form a blurred image.

2. The method of claim 1, further comprising assigning, by the system, respective weights to each pixel in each compartment according to an associated degree of similarity of the color of the pixel to the color associated with the compartment, and the blurring comprises adjusting respective degree of blur for each pixel in each compartment based upon the assigned weight.

3. The method of claim 2, wherein weight increases as the similarity increases and the degree of blur increases as the weight increases.

4. The method of claim 1, further comprising, prior to the blurring, downsampling, by the system, the image to obtain a lower resolution image than that of the image, and the blurring comprises blurring the lower resolution image to form respective blurred lower resolution images for each compartment.

5. The method of claim 4, further comprising sharpening, by the system, edges in the image by employing an antisotropic diffusion filter.

6. The method of claim 5, wherein the antisotropic diffusion filter employsa conduction function.

7. The method of claim 4, further comprising performing, by the system, a final bilateral blur of the image using the bilinear filtering process on the blurred lower resolution images to form the blurred image.

8. The method of claim 1, further comprising detecting, by the system, edges in the image.

9. The method of claim 8 further comprising sharpening, by the system, the image by applying image-based warping.

10. The method of claim 1, wherein the blurring comprises employing a Gaussian function.

11. The method of claim 1, wherein the one or more directions includes at least one of a vertical or a horizontal direction.

12. The method of claim 1, wherein at least one color associated with a compartment is at least one of a primary color or a combined color.

13. The method of claim 1, further comprising abstracting, by the system, the image to introduce cartoon shaped effects.

14. The method of claim 1, wherein at least two compartments located in different portions of the image have the same associated color.

15. A system, comprising:
a memory, communicatively coupled to a processor, the memory having stored therein executable instructions, comprising:
a bucketing component that assigns respective pixels of an image, based upon their respective colors, to respective compartments having an associated color, wherein the respective pixels within each compartment have the respective colors within a predetermined threshold of the associated color; and
a blurring component that iteratively for each compartment employs a bilateral filter operation to blurs the image in one or more directions traversing from the compartment based on the color associated with the compartment to generate a blurred image.

16. The system of claim 15, further comprising:
a subsampling component that, prior to the bucketing component blurring the image, creates a lower resolution image from the image; and
the blurring component blurs the lower resolution image to form respective blurred lower resolution images for each compartment.

17. The system of claim 16, wherein the blurring component performs a final bilateral blur of the image using the bilinear filtering operation on the blurred lower resolution images to form the blurred image.

18. The system of claim 15, further comprising:
a weight coefficient processing component that assigning respective weights to each pixel in each compartment according to an associated degree similarity of the color of the pixel to the color associated with the compartment; and
the blurring component adjusts respective degree of blur for each pixel in each compartment based upon the assigned weight.

19. The system of claim 18, wherein weight increases as the similarity increases and the degree of blur increases as the weight increases.

20. The system of claim 15, wherein at least two compartments located in different portions of the image have the same associated color.

21. A non-transitory computer-readable medium having instructions stored thereon that, in response to execution, cause a system including a processor to perform operations comprising:
partitioning an image into a plurality of compartments, wherein each compartment has an associated color and respective pixels within each compartment have respective colors within a predetermined threshold of the associated color; and
iteratively for each compartment, employing a bilateral filter process for blurring the image in one or more directions traversing from the compartment based on the color associated with the compartment to form a blurred image.

22. The non-transitory computer-readable medium of claim 21, further comprising assigning respective weights to each pixel in each compartment according to an associated degree of similarity of the color of the pixel to the color associated with the compartment, and the blurring comprises adjusting respective degree of blur for each pixel in each compartment based upon the assigned weight.

23. The non-transitory computer-readable medium of claim 22, wherein weight increases as the similarity increases and the degree of blur increases as the weight increases.

24. The non-transitory computer-readable medium of claim 21, further comprising, prior to the blurring, downsampling the image to obtain a lower resolution image than that of the image, and the blurring comprises blurring the lower resolution image to form respective blurred lower resolution images for each compartment.

25. The non-transitory computer-readable medium of claim 24, further comprising performing a final bilateral blur of the image using the bilinear filtering process on the blurred lower resolution images to form the blurred image.

26. The non-transitory computer-readable medium of claim 21, wherein at least two compartments located in different portions of the image have the same associated color.

27. The non-transitory computer-readable medium of claim 21, further comprising detecting edges in the image.

28. The non-transitory computer-readable medium of claim 27, further comprising sharpening edges in the image by employing an antisotropic diffusion filter.

29. The non-transitory computer-readable medium of claim 21, wherein the blurring comprises employing a Gaussian function.

30. The non-transitory computer-readable medium of claim 21, wherein the one or more directions includes at least one of a vertical or a horizontal direction.

31. The non-transitory computer-readable medium of claim 21, wherein at least one color associated with a compartment is at least one of a primary color or a combined color.

* * * * *